(12) United States Patent
Flemming et al.

(10) Patent No.: US 10,549,524 B2
(45) Date of Patent: Feb. 4, 2020

(54) CONTROL CONSOLE OF A PRINTING MACHINE

(71) Applicant: KOENIG & BAUER AG, Würzburg (DE)

(72) Inventors: Steven Flemming, Berlin (DE); Jens Lochmüller, Bielefeld (DE); Gero Kosel, Salzkotten (DE); Stefan Budach, Detmold (DE); Martina Noack, Dresden (DE)

(73) Assignee: Koenig & Bauer AG, Wurzburg (DE)

(*) Notice: Subject to any disclaimer, the term of this patent is extended or adjusted under 35 U.S.C. 154(b) by 0 days.

(21) Appl. No.: 16/300,097

(22) PCT Filed: May 16, 2017

(86) PCT No.: PCT/EP2017/061695
§ 371 (c)(1),
(2) Date: Nov. 9, 2018

(87) PCT Pub. No.: WO2017/198649
PCT Pub. Date: Nov. 23, 2017

(65) Prior Publication Data
US 2019/0143673 A1    May 16, 2019

(30) Foreign Application Priority Data
May 18, 2016 (DE) ........................ 10 2016 208 521

(51) Int. Cl.
*B41F 33/00* (2006.01)
*B41F 33/16* (2006.01)
(Continued)

(52) U.S. Cl.
CPC ...... *B41F 33/0009* (2013.01); *B41F 33/0036* (2013.01); *G01S 15/08* (2013.01); *G06K 9/00355* (2013.01)

(58) Field of Classification Search
CPC .. B41F 33/00; B41F 33/0009; B41F 33/0018; B41F 33/0036; B41F 33/16
(Continued)

(56) References Cited

U.S. PATENT DOCUMENTS

| 8,395,809 B2 | 3/2013 | Engler et al. |
| 9,898,690 B2 | 2/2018 | Berg et al. |

(Continued)

FOREIGN PATENT DOCUMENTS

| DE | 10120487 A1 | 11/2002 |
| DE | 102007020511 A1 | 11/2007 |

(Continued)

OTHER PUBLICATIONS

International Search Report of PCT/EP2017/061695 dated Aug. 9, 2017.
(Continued)

*Primary Examiner* — Leslie J Evanisko
(74) *Attorney, Agent, or Firm* — Mattingly & Malur, PC

(57) ABSTRACT

A control station of a printing machine has at least one surface for receiving a sheet-like printing substrate, a measuring device for measuring a measurement variable of the sheet-like printing substrate on the surface, at least one camera for capturing at least one gesture performed by a person at the control station, and an image-processing device for processing and evaluating images captured by the camera. The measuring device has a measuring beam extending above the sheet-like printing substrate. The measuring beam of the measuring device can be moved over the sheet-type printing substrate on the surface. The camera which captures each at least one gesture, is arranged in or on the movable measuring beam. The measuring beam is driven by a controlled or by an at least controllable motor in order to carry out the movement. Controlling of the motor of the
(Continued)

measuring beam is actuated by at least one gesture performed by the person in a capturing region of the camera and captured by the camera.

15 Claims, 3 Drawing Sheets

(51) Int. Cl.
*G01S 15/08* (2006.01)
*G06K 9/00* (2006.01)

(58) Field of Classification Search
USPC .......................................................... 101/484
See application file for complete search history.

(56) References Cited

U.S. PATENT DOCUMENTS

| | | | | |
|---|---|---|---|---|
| 2007/0272106 | A1* | 11/2007 | Hauck | B41F 33/0036 101/484 |
| 2008/0087114 | A1 | 4/2008 | Engler et al. | |
| 2015/0138121 | A1* | 5/2015 | Koenig | B41F 33/0009 345/173 |
| 2015/0206020 | A1* | 7/2015 | Jurkewitz | B41F 33/00 382/112 |

FOREIGN PATENT DOCUMENTS

| | | |
|---|---|---|
| DE | 102006048539 A1 | 4/2008 |
| DE | 102012022882 A1 | 5/2014 |
| EP | 2735947 A1 | 5/2014 |
| EP | 1911588 B2 | 6/2018 |
| WO | 2014/122280 A1 | 8/2014 |

OTHER PUBLICATIONS

Static Hand Gesture Recognition using an Android Device; International Journal of Computer Applications; vol. 120, No. 21; pp. 48-53; Jun. 2015; Tejashri J. Joshi et al.

* cited by examiner

CONTROL CONSOLE OF A PRINTING MACHINE

CROSS REFERENCE TO RELATED APPLICATIONS

This application is the U.S. National Phase, under 35 U.S.C. § 371, of PCT/EP2017/061695, filed May 16, 2017; published as WO 2017/198649 A1 on Nov. 23, 2017, and claiming priority to DE 10 2016 208 521.2, filed May 18, 2016, the disclosures of which are expressly incorporated herein in their entireties by reference.

FIELD OF THE INVENTION

The present invention relates to a control console of a printing machine. The control console of the printing machine includes at least one support surface for receiving a sheet-type printing substrate, a measuring device for measuring a measured variable of the sheet-type substrate placed on the support surface, at least one camera for capturing at least one gesture performed by a person at the control console, and an image processing device for processing and evaluating images captured by the camera.

BACKGROUND OF THE INVENTION

From DE 10 2012 022 882 A1, a device for controlling a machine used in the graphic arts industry is known, having a control console, said control console having at least one screen for the display of machine information, wherein the control console is equipped with a plurality of sensors for detecting gestures of an operator operating the machine via the control console, wherein the control console is equipped with a support surface, disposed underneath at least one screen, for receiving a sheet-type printing substrate, wherein at least one sensor is situated such that it is capable of recognizing gestures made by the operator with his fingers on the surface of a printing substrate that rests on said support surface, wherein the sensors are preferably cameras, and wherein the control console is preferably equipped with a colorimeter for examining a sheet-type printing substrate resting on the support surface, and the colorimeter can be controlled by means of the sensors for detecting gestures.

DE 10 2006 048 539 A1 discloses a device for positioning a measuring head above a printing substrate, including a display device and a motor-driven positioning device for the measuring head, wherein the positioning device for the measuring head can be controlled by a computer which is connected to the display device.

A camera for detecting at least one gesture performed by a person is known from the document JOSHI, Tejashri J.; KUMAR, Shiva; TARAPORE, N. Z.; MOHILE, Vivek: Static Hand Gesture Recognition using an Android Device, in: International Journal of Computer Applications (0975-8887), Volume 120, June 2015, pp. 48-53, available online at http://research.ijcaonline.org/volume120/number21/pxc3904348.pdf, retrieved on Jan. 4, 2017.

DE 101 20 487 A1 discloses a control console of a printing machine, comprising at least one support surface for receiving a sheet-type printing substrate and a measuring device for measuring a measured variable of the sheet-type printing substrate placed on the support surface, the measuring device being equipped with a measuring bar extending above the sheet-type printing substrate, and the measuring bar of the measuring device being movable above the sheet-type printing substrate that has been placed on the support surface.

SUMMARY OF THE INVENTION

The object of the present invention is to provide a control console of a printing machine in which the control console, in particular for use as a measuring device mounted on a movable measuring bar, is easy and convenient to operate.

The object is attained according to the invention by the provision of the measuring device including a measuring bar extending above the sheet-type printing substrate, and by the provision of the measuring bar of the measuring system being capable of being moved along the sheet-type printing substrate that has been placed on the support surface. Each camera, for capturing at least one gesture, is disposed in or on the movable measuring bar. The movement of the measuring bar is driven by a controlled, or at least by a controllable motor. At least the control of the motor of the measuring bar is actuated by at least one gesture performed by the person within the capturing region of the camera and captured by the camera.

The advantages to be achieved by the invention consist, in particular, in that at the control console, at least one control function can be initiated in a contact-free manner by a person, in particular by an operator of the printing machine. The control functions that can be initiated here involve primarily starting or stopping a motor-driven measuring device and/or immobilizing the printing substrate relative to the measuring device and/or initiating a measuring operation with said measuring device, said measuring device being a module which is part of the control console. Safety-critical control functions for operating the printing machine, in particular its drives, are not the focus under consideration here. Since the control functions, in particular the actuation of the measuring device, are initiated without contact, the risk while operations are being carried out at the control console is non-existent or is at least greatly reduced, e.g. that control elements and/or a screen of the measuring device and/or of the control console may become soiled, e.g. by printing ink or the like that is transferred by the operator's hand from the printing substrate still wet with ink. In addition, the proposed control concept is inexpensive to implement. It can be easily learned quickly and intuitively by operators controlling the printing machine. Additional advantages will become apparent in the following description.

BRIEF DESCRIPTION OF THE DRAWINGS

One exemplary embodiment of the invention is illustrated in the set of drawings and will be described in greater detail below.

In the drawings.

DESCRIPTION OF THE PREFERRED EMBODIMENT

Figure 1:
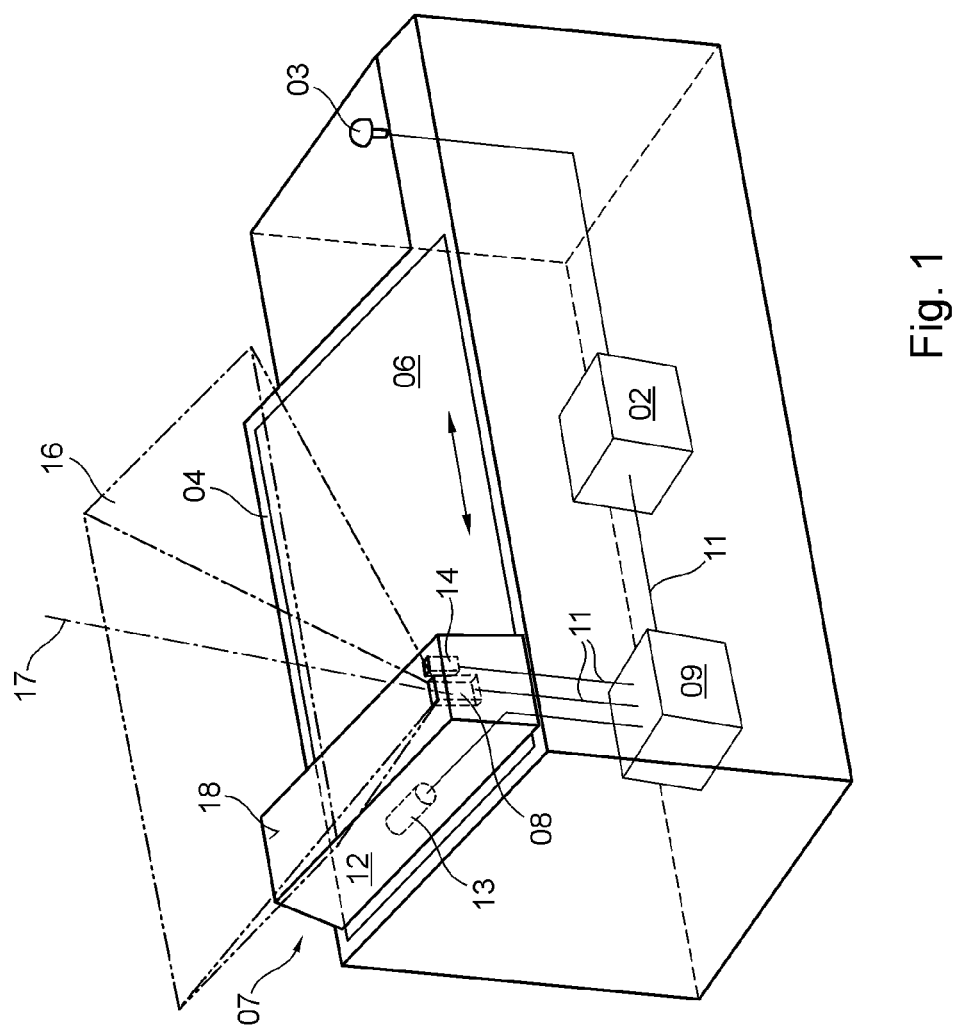
FIG. 1 is a diagram of a control console.

FIG. 1 shows, in a perspective, simplified view by way of example, a control console 01 of a printing machine, embodied e.g. as a sheet-fed printing machine (not shown), said control console 01 and the printing machine being connected to one another at least via a data link and typically being arranged in spatial proximity to one another. The printing machine is, e.g. a rotary printing machine that prints in an offset printing process or is a printing machine that prints in a non-impact, i.e. plateless printing process, i.e. known as a digital printing machine.

The control console 01 comprises a preferably electronic control unit 02 for the mechanical, e.g. drive control of the printing machine, and a human-machine interface which is connected to the control unit 02 and is equipped with at least one control element 03, e.g. an emergency shut-off switch, along with at least the following modules and/or elements:
a) a support surface 04, e.g. in table form, in particular configured as flat, with a surface formed, e.g. as black for receiving typically the full surface of a sheet-type printing substrate 06, e.g. a sheet of paper, cardboard or paperboard, wherein the printing sheet, which is rectangular in particular, has edge lengths within the range, e.g. of 110 mm×900 mm or greater and which, due to its size, is preferably placed on the support surface 04 by a person working at the control console 01 using both hands, so that a printed image applied to said sheet by the printing machine can be inspected, wherein the sheet-type printing substrate 06 placed on the support surface 04 is or at least can be held in place there in its respective position, immobilized e.g. by means of suction air that can be switched on and off,
b) e.g. an optoelectronic measuring device 07 for measuring a measured variable of the sheet-type printing substrate 06 placed on the support surface 04, e.g. for measuring the color density and/or the color value and/or the register and/or the color registration in the relevant printed image applied to the printing substrate 06 by the printing machine,
c) at least one preferably digital camera 08 for detecting at least one gesture performed at the control console 01 by a person using at least one of his/her hands, the camera in question 08 being embodied, e.g. as a semiconductor camera having at least one image sensor, in particular having a CMOS image sensor,
d) and an image processing device 09, in particular electronic, preferably having at least one computing unit for processing and evaluating images captured by the camera 08 in question, wherein images captured by the camera 08 in question are forwarded, in particular in the form of digital image data, from the camera 08 in question, e.g. via a data line 11 or wirelessly, to the image processing device 09. The image processing device 09 is in turn connected, e.g. via a further data line 11 or via a wireless data link, e.g. to the control unit 02 for controlling the printing machine. The data line 11 connecting the various devices and/or units to one another is embodied, e.g. as a data bus system.

Measuring device 07 is equipped with a measuring bar 12, preferably extending linearly above the sheet-type printing substrate 06, the measuring bar 12 of measuring device 07 being movable bidirectionally, in particular linearly, preferably in the directions indicated by a double arrow in FIG. 1, i.e. longitudinally along a front side of the control console 01 facing the person, above the printing substrate 06, i.e. above the sheet-type printing substrate 06 placed and preferably immobilized on the support surface 04. Advantageously, the camera 08 in question for capturing at least one gesture is located in or on the movable measuring bar 12. This configuration is highly advantageous in particular because the camera 08 in question thus disposed cannot be covered by the printing substrate 06 or by the measuring bar 12 of measuring device 07. As a consequence, the camera 08 in question is freely accessible at all times to the person working at the control console 01. The movement of measuring bar 12 is driven by a motor 13, which is or at least can be controlled e.g. by the control unit 02, wherein at least the control of the motor 13 of measuring bar 12 is or at least can be actuated in a contact-free manner, in particular by at least one gesture performed by the person in a capturing region 16 of the camera 08 in question and captured by the camera 08 in question. Alternatively or in addition to the control of the motor 13 of measuring bar 12, a measuring operation to be carried out using measuring bar 12 of measuring device 07 is or at least can be controlled by at least one gesture performed by the person within the capturing region 16 of the camera 08 in question and captured by said camera 08. The switching on and/or switching off of the suction air required for immobilizing a sheet-type printing substrate 06 placed on support surface 04 is also actuated or at least actuable, e.g. by means of at least one gesture, wherein the gesture captured by the camera 08 in question controls or at least can control, e.g. at least one pneumatic valve. The specific gesture which is required to actuate the motor 13 of measuring bar 12 and/or to initiate the measuring operation and/or to switch the suction air on and/or off and which is performed by a person working at the control console 01 using at least one hand is either stored in the program used by the image-analyzing image processing device 09 or is taught there, i.e. specific image data that will lead to an initiation of a specific control function are defined.

In the preferred embodiment, the capturing region 16 of the camera 08 in question is directed facing away from support surface 04, in particular vertically upward, wherein the camera 08 in question captures the at least one gesture performed in its capturing region 16 by the person, or wherein the at least one gesture performed in its capturing region 16 by the person at least can be captured by the camera 08 in question. The camera 08 in question is preferably disposed in or on measuring bar 12, at the end thereof facing the person who performs the at least one gesture, e.g. within a range of up to 200 mm from the front side of control console 01 that faces the person. As is clear in particular from FIGS. 2 and 3, the capturing region 16 of the camera 08 in question preferably opens up lengthwise along the front side of control console 01 and/or also orthogonally thereto, each in an obtuse opening angle $\varphi 1$; $\varphi 2$, preferably in an opening angle $\varphi 1$; $\varphi 2$ within a range of 135°, each preferably symmetrically to a central axis 17 of the capturing region 16 of the camera 08 in question. If support surface 04 is configured as sloping downward, e.g. in ramp form, toward the front side of control console 01, with this slope measuring, e.g. less than 30°, in particular less than 15°, from horizontal, the capturing region 16 of the camera 08 in question for capturing the gesture performed by the person is inclined, e.g. by the same angle as the support surface 04 toward the front side of control console 01 (FIG. 2), so that the central axis 17 of the capturing region 16 of the camera 08 in question is always arranged perpendicular to support surface 04.

Figure 2:
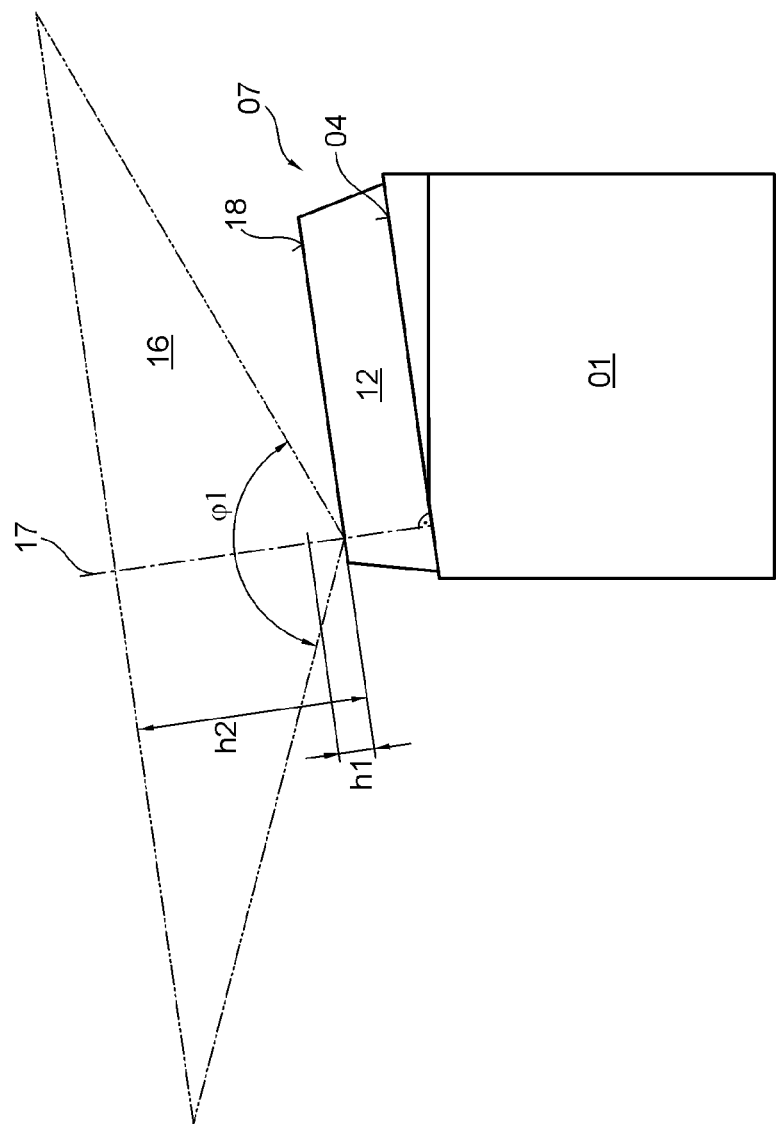
FIG. 2 shows the control console of FIG. 1 in a side view.
Figure 3:
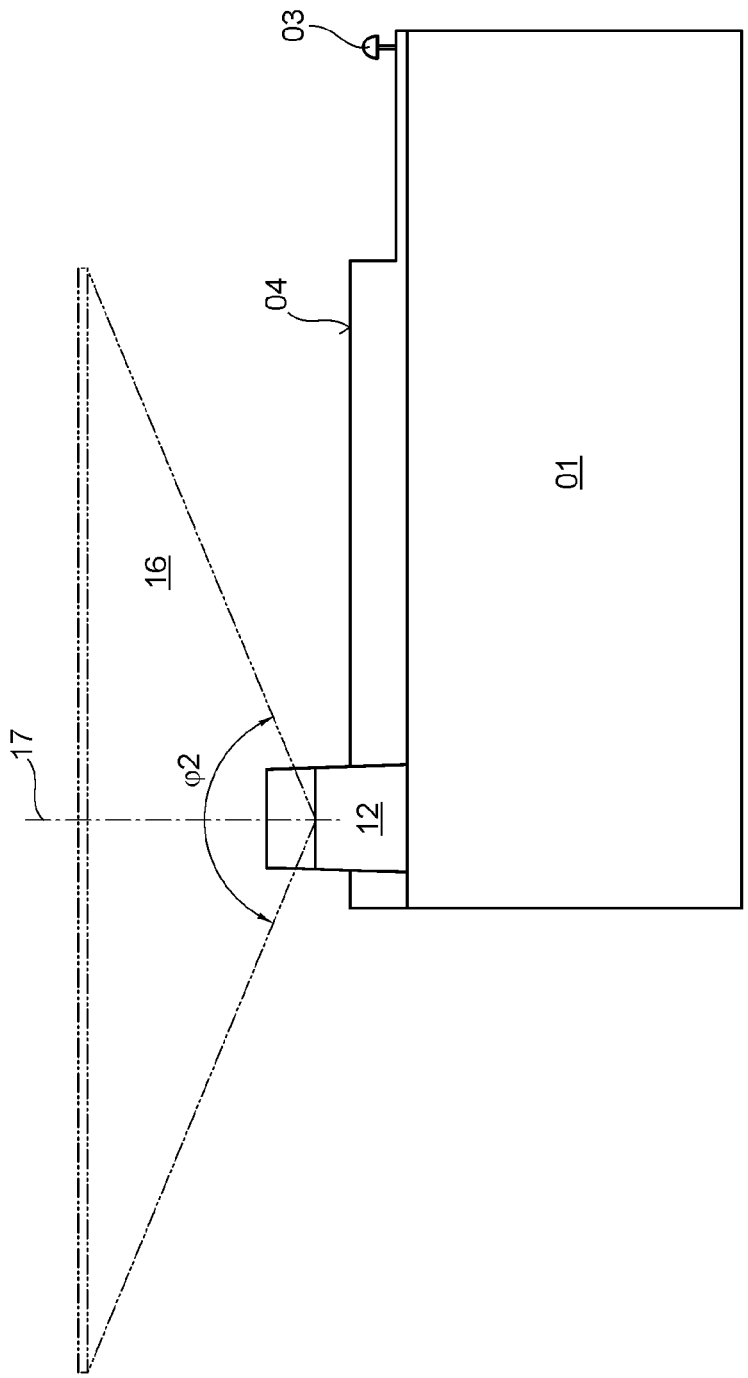
FIG. 3 shows the control console of FIG. 1 in a front view.

In an advantageous refinement of the identified solution, in conjunction with the camera 08 in question, i.e. in particular in or on measuring bar 12, e.g. adjacent to the image sensor of the camera 08, a distance sensor 14 is provided, wherein distance sensor 14 measures the distance between said camera 08 and the gesture performed by the person, in particular within the capturing region 16, or wherein distance sensor 14 is at least capable of measuring the distance between said camera 08 and the gesture performed by the person, in particular within the capturing region 16. Distance sensor 14, like the camera in question 08, is preferably disposed in or on the measuring bar 12, at the end thereof that faces the person performing the at least one gesture. The capturing region 16 of the camera 08 in question, defined, for example, by a lens used by said camera, begins at a first height h1 of, e.g. 100 mm, e.g. above an upper boundary surface 18 of measuring bar 12, and extends up to a second height h2 of, e.g. 650 mm, e.g. above the upper boundary surface 18 of measuring bar 12 (FIG. 2). Distance sensor 14 can thus be used to check whether a gesture performed by the person has been performed within the capturing region 16 defined by the heights h1; h2. The heights h1; h2 in conjunction with the opening angles φ1; φ2 of the capturing region 16 of the camera 08 in question define a measuring space. In the preferred embodiment of the identified solution, only one gesture performed by the person within the measuring space thus defined to initiate a control function is allowable, and/or only one such gesture for controlling the motor 13 of the measuring bar 12 and/or for switching on/off the suction air for immobilizing the printing substrate 06 on the support surface 04 and/or for controlling a measuring operation to be carried out using the measuring bar 12 of measuring device 07 is evaluated by the image processing device 09. Thus, a control function is or at least can be initiated by means of the gesture captured by the camera 08, however each such control function is or at least can be initiated dependent upon the measured distance of distance sensor 14. The distance-dependent initiation of a control function increases the operational reliability, e.g. of measuring device 07. Additionally, it increases the certainty of a person working at the control console 01 as to the limited measuring space within which gestures performed are suitable for initiating a control function. In other places, i.e. outside of the defined measuring space, gestures are ineffectual with regard to a control function.

Distance sensor 14 includes, e.g. at least one laser, and preferably two arranged at positions spaced apart from one another, with which the distance between the camera 08 and the gesture performed by the person is determined, e.g. using a triangulation method. Triangulation is a geometric method of optical distance measurement that involves measuring two angles within triangles. The distance of a measured object, e.g. the hand of a person performing a gesture, from a straight base line connecting the positions of the lasers is calculated by means of trigonometric functions, in which the two angles proceeding from this base line each open toward the measured object, and the distance between the respective origins of these angles given by the positions of the lasers is known. Alternatively, distance sensor 14 may be embodied, e.g. as an ultrasonic sensor and the distance to the hand of a person performing a gesture can be determined, e.g. by a measurement of the transit time between the transmission of at least one ultrasonic pulse and the reception of its echo. Distance sensor 14 provides its measurements, e.g. to the image processing device 09. The calculations to be performed in the triangulation method are carried out, e.g. in the image processing device 09 by its computing unit. Alternatively, the distance between the camera 08 in question and the gesture performed by the person may also be measured, e.g. by means of two cameras 08 arranged spaced apart from one another or by means of one camera 08 having two image sensors arranged spaced apart from one another. The camera(s) 08 and/or the distance sensor 14 are preferably perpetually active, so that a control command can be issued at any time at the control console 01 by means of a gesture.

Control console 01 is preferably equipped with additional modules not shown in the figures. For instance, at least one screen for displaying machine information is provided, for example, e.g. a screen embodied as a touchscreen, this at least one screen being embodied, e.g. as a large screen, known as a wall screen, and being disposed in particular lengthwise along the rear side of control console 01. Control console 01 is further equipped e.g. with an enclosure extending at least above support surface 04, with a lighting device, for example, being located within the enclosure. Said lighting device also includes, e.g. at least one infrared light source. This lighting device is disposed, e.g. such that it illuminates the associated capturing region 16 of the camera 08 in question, enabling a gesture performed by a person at the control console 01 to be detected, or at least detected with better quality.

While a preferred embodiment of a control console of a printing machine, in accordance with the present invention, has been set forth fully and completely hereinabove, it will be apparent to one of skill in the art that various changes could be made thereto, without departing from the true spirit and scope of the present invention, which is accordingly to be limited only by the appended claims.

The invention claimed is:

1. A control console of a printing machine, comprising:
at least one support surface for receiving a sheet-type printing substrate;
a measuring device for measuring a measured variable of the sheet-type printing substrate placed on the support surface;
at least one camera for capturing, within a capturing region of the at least one camera, at least one gesture performed by a person at the control console, and;
an image processing device for processing and evaluating images captured by said at least one camera, wherein the measuring device includes a measuring bar extending above the sheet-type printing substrate, wherein the measuring bar of the measuring device can be moved above the sheet-type printing substrate that has been placed on the support surface, wherein said at least one camera capturing the at least one gesture is disposed one of in and on the movable measuring bar, wherein movement of the measuring bar is driven by one of a controlled and an at least controllable motor, and wherein at least the control of the motor of the measuring bar is actuated by the at least one gesture performed by the person within the capturing region of said at least one camera and captured by said at least one camera.

2. The control console according to claim 1, wherein the capturing region of said at least one camera faces away from the support surface and is directed upward, one of wherein the at least one camera captures the at least one gesture performed within the capturing region by the person, and wherein the at least one camera is at least capable of capturing the at least one gesture performed within the capturing region by the person.

3. The control console according to claim 1, wherein a measuring operation to be carried out using the measuring bar of the measuring device is controlled by at least one gesture performed by the person within the capturing region of the at least one camera and is captured by the at least one camera.

4. The control console according to claim 1 further comprising a distance sensor associated with the at least one camera, and wherein the distance sensor measures a distance between said at least one camera and the at least one gesture performed by the person.

5. The control console according to claim 4, wherein the distance sensor comprises one of at least one laser and one ultrasonic sensor.

6. The control console according to claim 4, wherein one of the at least one camera the distance sensor is perpetually active.

7. The control console according to claim 4, wherein the at least one gesture captured by the at least one camera initiates a control function, wherein the control function one of is and can be initiated dependent upon a distance measured by the distance sensor.

8. The control console according to claim 7, wherein the control function one of initiates a measuring operation of the measuring device and an immobilization of the sheet-type printing substrate on the support surface.

9. The control console according to claim 4, wherein one of the at least one camera and the distance sensor one of is and can be disposed one of in and on the measuring bar, at an end of the measuring bar facing the person performing the at least one gesture.

10. The control console according to claim 1, wherein the measuring bar can be moved linearly and bidirectionally above the support surface.

11. The control console according to claim 1, wherein the capturing region of the at least one camera opens up lengthwise along one of a front side of the control console and orthogonally thereto, in an obtuse opening angle ($\varphi1$; ($\varphi2$).

12. The control console according to claim 1, wherein the capturing region of the at least one camera opens up symmetrically to a central axis of the capturing region.

13. The control console according to claim 1, wherein the support surface is configured as sloping downward toward a front side of the control console at a support surface angle of inclination, wherein the capturing region of the at least one camera for capturing the at least one gesture is inclined at a capturing region angle of inclination, which capturing region angle of inclination is the same as the support surface angle of inclination toward the front side of the control console, so that a central axis of the capturing region of the at least one camera is always disposed perpendicular to the support surface.

14. The control console according to claim 1, wherein the capturing region of the at least one camera is configured as beginning at a first height ($h1$) above an upper boundary surface of the measuring bar and extending to a second height ($h2$), different from the first height ($h1$), above the upper boundary surface of the measuring bar.

15. The control console according to claim 14, wherein the at least one gesture captured by the at least one camera initiates a control function, the control function one of is and can be initiated, dependent upon a distance measured by a distance sensor associated with the at least one camera, only if the at least one gesture performed by the person has been captured within the capturing region of the at least one camera defined by the first and the second height ($h1$; $h2$).

* * * * *

UNITED STATES PATENT AND TRADEMARK OFFICE
CERTIFICATE OF CORRECTION

| | | |
|---|---|---|
| PATENT NO. | : 10,549,524 B2 | Page 1 of 1 |
| APPLICATION NO. | : 16/300097 | |
| DATED | : February 4, 2020 | |
| INVENTOR(S) | : Flemming et al. | |

It is certified that error appears in the above-identified patent and that said Letters Patent is hereby corrected as shown below:

In the Claims

Column (7): Claim 6, Line 8 after "camera" insert --and--.

Signed and Sealed this
Third Day of May, 2022

Katherine Kelly Vidal
*Director of the United States Patent and Trademark Office*